(12) United States Patent
Muendel et al.

(10) Patent No.: US 11,302,038 B2
(45) Date of Patent: Apr. 12, 2022

(54) SYSTEM AND METHOD FOR GENERATING AN AUGMENTED REALITY EXPERIENCE

(71) Applicant: BRIGHTLINE, Alexandria, VA (US)

(72) Inventors: Erik Muendel, Alexandria, VA (US); Tyler Gates, Arlington, VA (US); Jason Powers, Silver Spring, MD (US)

(73) Assignee: BRIGHTLINE INTERACTIVE, LLC, Ashburn, VA (US)

( * ) Notice: Subject to any disclaimer, the term of this patent is extended or adjusted under 35 U.S.C. 154(b) by 28 days.

(21) Appl. No.: 16/953,264

(22) Filed: Nov. 19, 2020

(65) Prior Publication Data
US 2021/0150773 A1    May 20, 2021

Related U.S. Application Data

(60) Provisional application No. 62/937,567, filed on Nov. 19, 2019.

(51) Int. Cl.
| | |
|---|---|
| *G06T 11/00* | (2006.01) |
| *G06F 3/0482* | (2013.01) |
| *H04L 51/222* | (2022.01) |
| *G06K 7/14* | (2006.01) |
| *G06K 7/10* | (2006.01) |
| *H04L 51/08* | (2022.01) |

(52) U.S. Cl.
CPC ............ *G06T 11/00* (2013.01); *G06F 3/0482* (2013.01); *G06K 7/10722* (2013.01); *G06K 7/1417* (2013.01); *H04L 51/08* (2013.01); *H04L 51/20* (2013.01); *G06T 2200/24* (2013.01)

(58) Field of Classification Search
CPC ... G06T 11/00; G06F 3/0482; G06K 7/10722; G06K 7/1417
USPC ......................................................... 345/633
See application file for complete search history.

(56) References Cited

U.S. PATENT DOCUMENTS

| | | | | |
|---|---|---|---|---|
| 9,378,560 | B2 * | 6/2016 | Iourcha | ................. G06T 15/005 |
| 2010/0027961 | A1 * | 2/2010 | Gentile | .................. H04N 5/272 |
| | | | | 348/584 |
| 2017/0148267 | A1 * | 5/2017 | Parker | ................... G07F 17/323 |

* cited by examiner

*Primary Examiner* — Thomas J Lett
(74) *Attorney, Agent, or Firm* — Kramer & Amado, P.C.

(57) ABSTRACT

A system for providing an augmented reality experience, including: a processor with a network connection; a display; and a camera, wherein the processor is configured to: read a first QR code from a user device using the camera; send a session identifier extracted from the QR code to a server; receive user input from a user device selecting individuals; select media content from a media library based on the received user input; combine live content of the user from the camera with the media content; display the combined content on the display; capture an image of the combined medial content and live content on the display; and output the captured image.

20 Claims, 26 Drawing Sheets

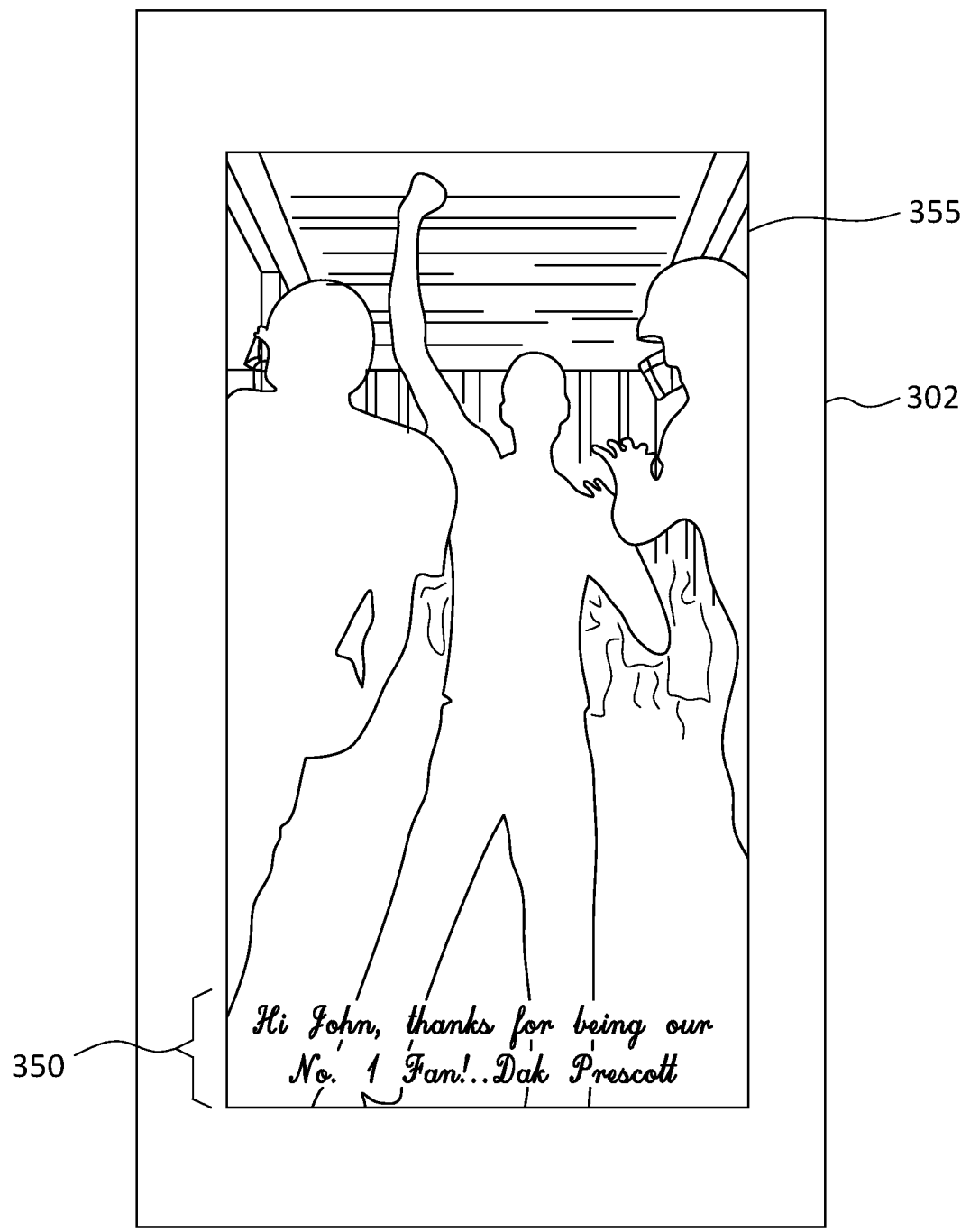
FIG. 3H1

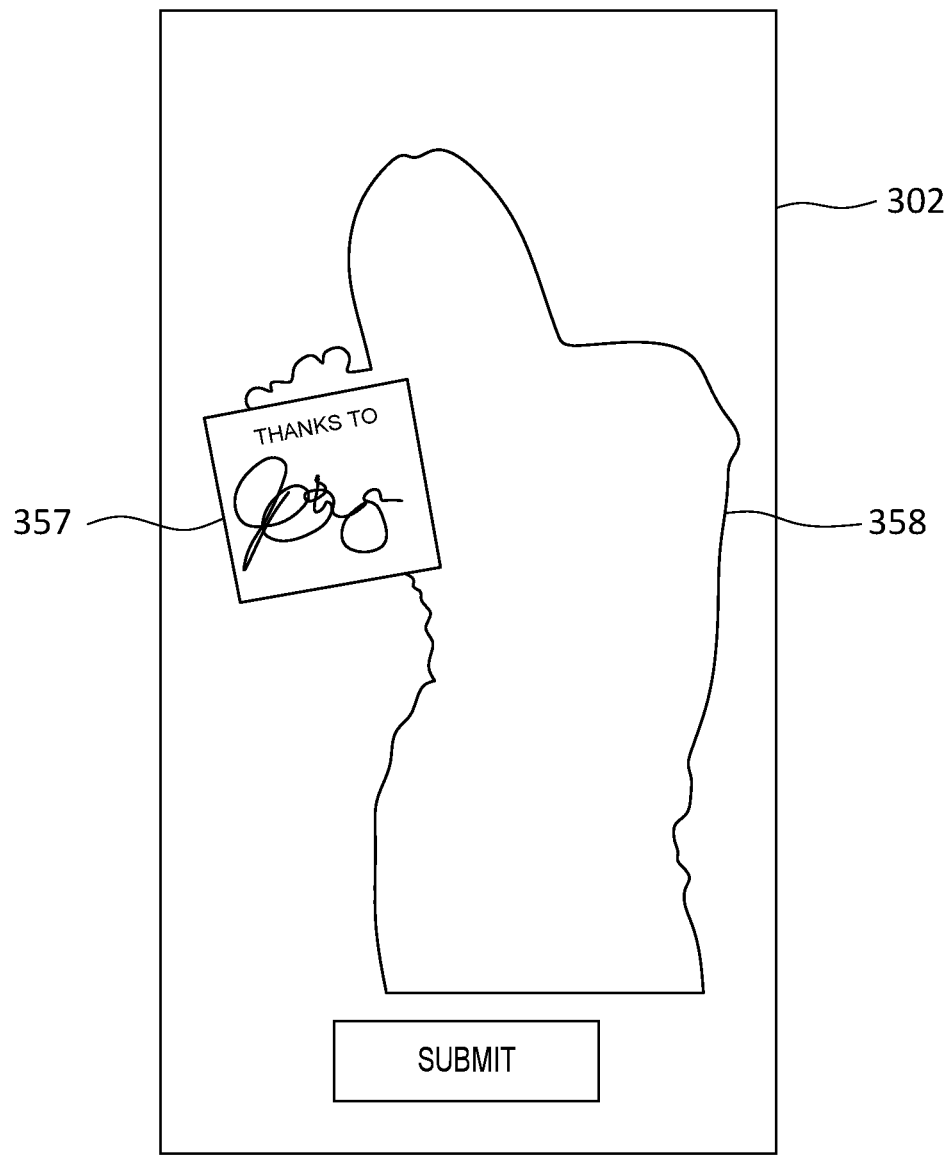
FIG. 3H2

SYSTEM AND METHOD FOR GENERATING AN AUGMENTED REALITY EXPERIENCE

CROSS-REFERENCE TO RELATED APPLICATIONS

This application claims benefit to U.S. Provisional Patent Application No. 62/937,567 filed Nov. 19, 2020, the contents of which are hereby incorporated by reference for all purposes as if fully set forth herein.

TECHNICAL FIELD

This disclosure relates generally to processing media information, and more specifically, but not exclusively, to a system and method for generating an augmented reality experience.

BACKGROUND

Various products have been developed to enhance the entertainment experience of consumers. Augmented reality (AR) systems seek to augment a real environment. For example, a to a visual representation of a real location, additional people or items may be overlaid to make it appear as if the added items are present. In other situations, AR systems may overlay information requested by the user over a visual representation of a scene. For example, if a user uses the camera on their mobile phone, an AR system may detect businesses, buildings, or other landmarks and present information regarding the detected locations.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a system for providing an augmented reality experience, including: a processor with a network connection; a display; and a camera, wherein the processor is configured to: read a first QR code from a user device using the camera; send a session identifier extracted from the QR code to a server; receive user input from a user device selecting individuals; select media content from a media library based on the received user input; combine live content of the user from the camera with the media content; display the combined content on the display; capture an image of the combined medial content and live content on the display; and output the captured image.

Various embodiments are described, wherein the processor is further configured to add personalized content to the captured image including the media content and the live content.

Various embodiments are described, wherein receiving user input from a user device selecting individuals includes reading a second QR code from the user device using the camera.

Various embodiments are described, wherein receiving user input from a user device selecting individuals is received from the server and wherein the user input is input on a user device and communicated to the server by the user device.

Various embodiments are described, wherein the processor is further configured to display instructions to the user to position themselves.

Various embodiments are described, wherein the processor is further configured to capture a video clip of the combined media content and live content on the display and to output the captured video clip.

Various embodiments are described, wherein the processor is further configured to receive a user input regarding a message delivery method, and send a message to the user using the received message delivery method providing the location to view and download the captured image.

Further various embodiments relate to a method performed by a user device for providing an augmented reality experience with a kiosk, including: receiving input information associated with the augmented reality experience at the kiosk; presenting a display to a user on the user device requesting user information; receiving user information; transmitting the user information to a server; generating a first QR code based upon the user information; displaying the first QR code on the user device; presenting a user interface displaying a plurality of individuals; receiving user input selecting a set of the plurality of individuals; and transmitting the set of selected individuals to the kiosk.

Various embodiments are described, where receiving input information associated with the augmented reality experience at the kiosk includes receiving a URL input by the user.

Various embodiments are described, where receiving input information associated with the augmented reality experience at the kiosk includes scanning a second QR code.

Various embodiments are described, wherein the user information includes one of a user name, a user email address, and a user phone number.

Various embodiments are described, wherein the first QR code includes an identifier for the user that was sent to the server.

Various embodiments are described, wherein transmitting the set of selected individuals to the kiosk includes transmitting the set of selecting individuals to the server.

Various embodiments are described, wherein transmitting the set of selected individuals to the kiosk includes generating a second QR code indicating the set of selected individuals and displaying the second QR code on the user device.

Various embodiments are described, further including receiving a messaging method input from the user indicating the users selected messaging method and transmitting the messaging method input to the server.

Various embodiments are described, further including receiving a message with a link to an image generated by the kiosk.

Various embodiments are described, further including receiving a user input selecting the link and displaying the image generated by the kiosk.

Various embodiments are described, wherein the steps of receiving input information associated with the augmented reality experience at the kiosk, presenting a display to a user on the user device requesting user information, receiving user information, and transmitting the user information to a server occur while the user is waiting to access the kiosk.

Various embodiments are described, further comprising the user selecting one of the plurality of individuals and displaying an animation of selected individual.

Further various embodiments relate to a system for providing an augmented reality experience, including: a processor with a network connection; a display; and a camera, wherein the processor is configured to: select media content from a media library based on a user selection signal; combine live content from the camera with the media content displaying the combined content on the display; capture an image of the combined medial content and live content on the screen; add personalized content to the captured image including the media content and the live content; and output the captured image with the added personalized content, wherein the media content corresponds to a predetermined entertainment theme and the live content includes an image of a user posing live at a screen position relative to the media content, the media content including display of one or more persons selected by the user selection signal, and wherein the personalized content includes a personal feature corresponding to the user.

DETAILED DESCRIPTION

One or more embodiments of the present invention relate to a system and method for providing an augmented reality entertainment experience for consumers. The concept of "augmented reality" may include, but is not limited to, experiences that superimpose, append, overlay, juxtapose, or otherwise combine media of various types and/or sources into integrated or associated content for output on at least one display screen.

Figure 1:
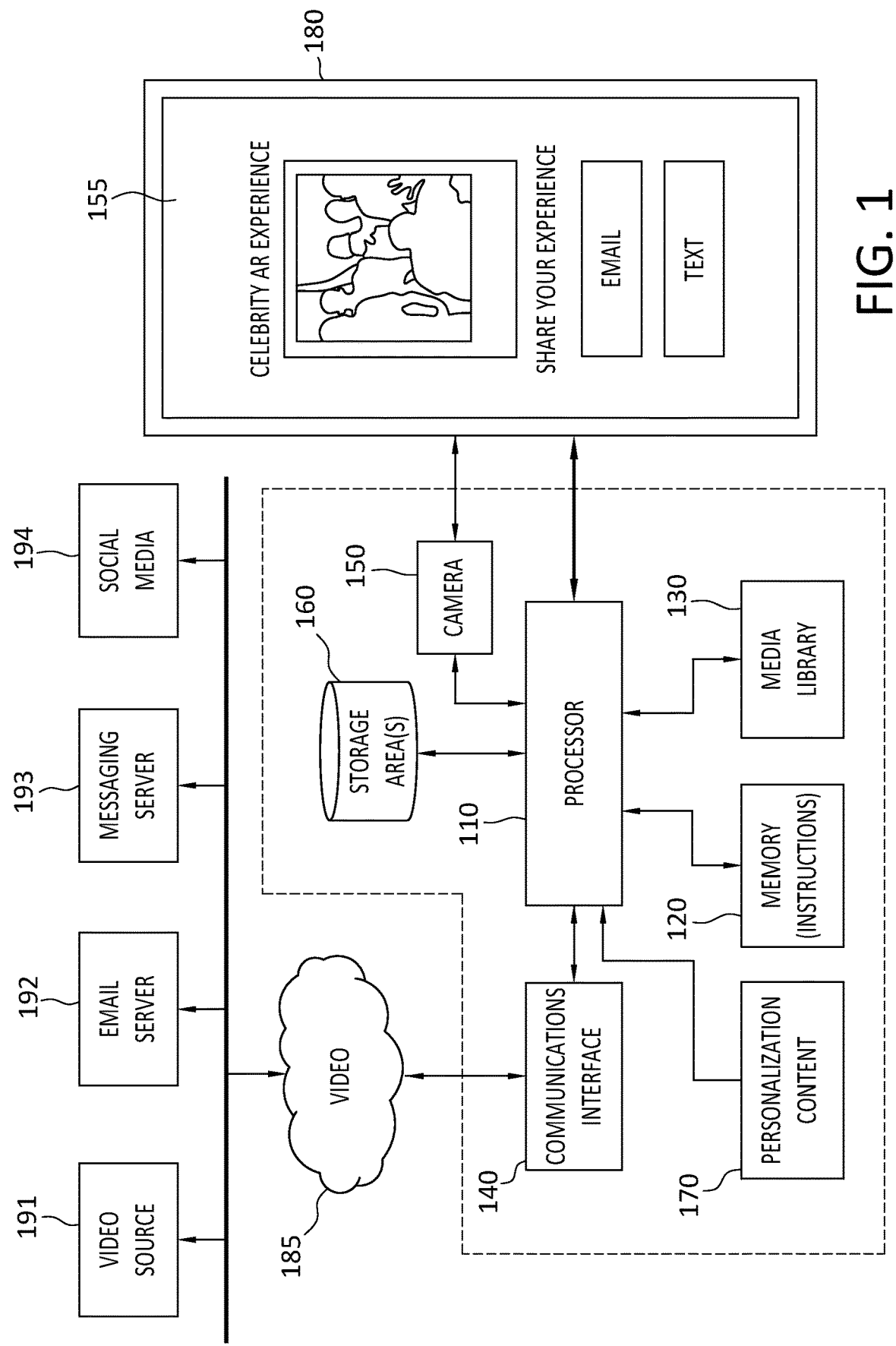
FIG. 1 illustrates an embodiment of a system for providing an augmented reality experience.

FIG. 1 illustrates an embodiment of a system for providing an augmented reality entertainment experience. The system includes a processor 110, a memory 120, a media library 130, a communications interface 140, camera 150, one or more storage areas 160, a storage area 170 for personalization content, and an output device 180.

The processor 110 may execute instructions in memory 120 for performing operations for providing the augmented reality experience. The instructions may be in the form of an application or other type of control software stored in a read-only memory, random-access memory, or other type of computer-readable medium of memory 120. In one embodiment, the memory 120 may be a hard drive, and the processor 110 may be a central processing unit, graphic processing unit, application-specific processor, or other one or more other types of integrated circuits. The processor may also execute the operating system for controlling communications, transactions, troubleshooting, the processing of input information, and the control of output information, as discussed in greater detail below.

The media library 130 may include media files that are all the same type or a combination of different types. For example, the media files may include video clips, audio clips, images, graphics, gifs, text, files including scanned information, and/or files including other types of media. While the media files are stored in the media library, in one embodiment some of the media files may be accessed from a remote source (e.g., a storage area accessible through a wired or wireless network) or from a removable storage medium coupled to the system for use by the processor 110.

The content of the media files matches the theme of the entertainment experience to be provided. For example, when the theme of the entertainment experience is sports, the content of the media files may include sports-related subject matter. In one embodiment, in order to allow for personalization and customization, a user may input information selecting a certain aspect of sports. For example, when the theme is football, a user may be allowed to select one or more players of interest from a particular football team. Such an example application is discussed in greater detail below, where the football team is the Dallas Cowboys and the system is located in a machine at AT&T Stadium. Related media files may include images or video clips of the selected players making plays, general clips of the team, and/or other football-related information. In one embodiment, preselected media files may be output on a screen during different modes of operation of the system, e.g., during the selection period of the user.

In one embodiment, the theme may be theme park related. In this case, the content of the media files may correspond to certain rides, animated or movie characters, and/or aspects of theme park which are preselected or which a user is allowed to select. In another embodiment, the theme may be related to a particular movie, e.g., Pirates of the Caribbean, Avengers, or another movie. In this case, the content of the media files may relate to certain characters of interest from the movie that are preselected or which a user is allowed to select. In another embodiment, the theme may be related to music. In this case, the content of the medial files may relate to a certain band, or band members, of interest that are preselected or which a user is allowed to select. In other embodiments, the content of the media files may correspond to other themes.

The communications interface 140 may couple the processor to one or more applications, sites, or systems through a network 185. In one embodiment, the communications interface may receive prerecorded video from video source 191. Such prerecorded videos may be of athletes or celebrities who enter a virtual picture with a user of the system. In another embodiment, the communications interface may receive a live broadcast signal from a video source 191. If the theme is a sporting event, the live video may show a game being played in real-time, a pre-game or post-game show (e.g., ESPN), sports scores or highlights from other games in the same or a different sport, a live camera feed of an interview or reporter on the field or court, and/or other information. The content from the video source may be played, for example, in one or more predetermined modes of the system, e.g., at an initial mode prior to initiation of the system by a user. In these or other embodiments, the communication interface 140 may couple the processor to one or more internet websites, e.g., the social media site of a user. In these or other embodiments, the communication interface 140 may couple the processor to an email server and/or a messaging service to be used in sending augmented reality content to persons designated by the user.

The camera 150 may capture live video or images of the user or a group of people. In one embodiment, a sensor 155 of the camera may be included in a display screen of a display that is included in the output device. The camera images and/or video is one of the ways in which the augmented reality entertainment experience may be customized and personalized in accordance with one or more embodiments. The live video or images taken by the camera may be processed to include various types of graphics to further enhance the experience. For example, a graphic of a team helmet or team logo may be superimposed on the image or video of a user when the camera content is combined with media files and/or live video by the processor.

The storage area 160 may store various types of data for the system. For example, the storage area may store augmented reality files generated by the processor for the specific theme under consideration. As will be described in greater detail below, the augmented reality files may be generated by combining the one or more of the media files stored in the media library with content from the camera and/or content from the video source, along with graphics or other forms of personalization information for customizing the entertaining experience.

The storage area 170 for storing the personalization content may be coupled to the processor along with the media library, camera, and video source. The personalization content may differ, for exampling, depending on the theme of the type of entertainment. When the entertainment is sports, and more particularly the Dallas Cowboys, the personalization content may include graphics objects or images of autographs of players selected by the user or even a personalized message including the user's name (e.g., when the user's name is John, the personalization content may be the message: "Hi _____, thanks for being our No. 1 Fan ! . . . 𝒟𝒶𝓁 𝒫𝓇𝑒𝓈𝒸𝑜𝓉𝓉." In this predetermined personalization content, the name "John" may be inserted into the blank space and included on the augmented reality content. This personalized message may be shown to the user on the display as part of the AR experience. The name, John, may be determined by the processor in response to a query requesting the user to enter his name. This content may then be combined with one or more media files of the selected player and/or other content as described herein. The resulting augmented reality file may then be stored in stored area 160, and then either printed out (if an image), emailed to an email server 192 designated by the user, sent in a text message to a messaging server 193 designated by the user, sent to a social media website 194 designated by the user, and/or a combination of these.

The output device 180 may include a display of a predetermined size to display the augmented reality content, whether the camera is used to capture the image or video of a single person or group of persons. In one embodiment, the camera sensor is integrated directly into a screen of the display. The display may also include a touch panel to allow for data entry by the user. In other embodiments an input device that might be a device separate from the display including small touch panel, keyboard, or other data entry device. For example, the display screen may output various menus to allow the user to select a method of payment, user name, email address, phone number, the players of the Dallas Cowboys she wants to pose with, and/or other media or content. These selections allow the user to personalize and customize the entertainment experience. The result may then be displayed for approval by the user.

Figure 2:
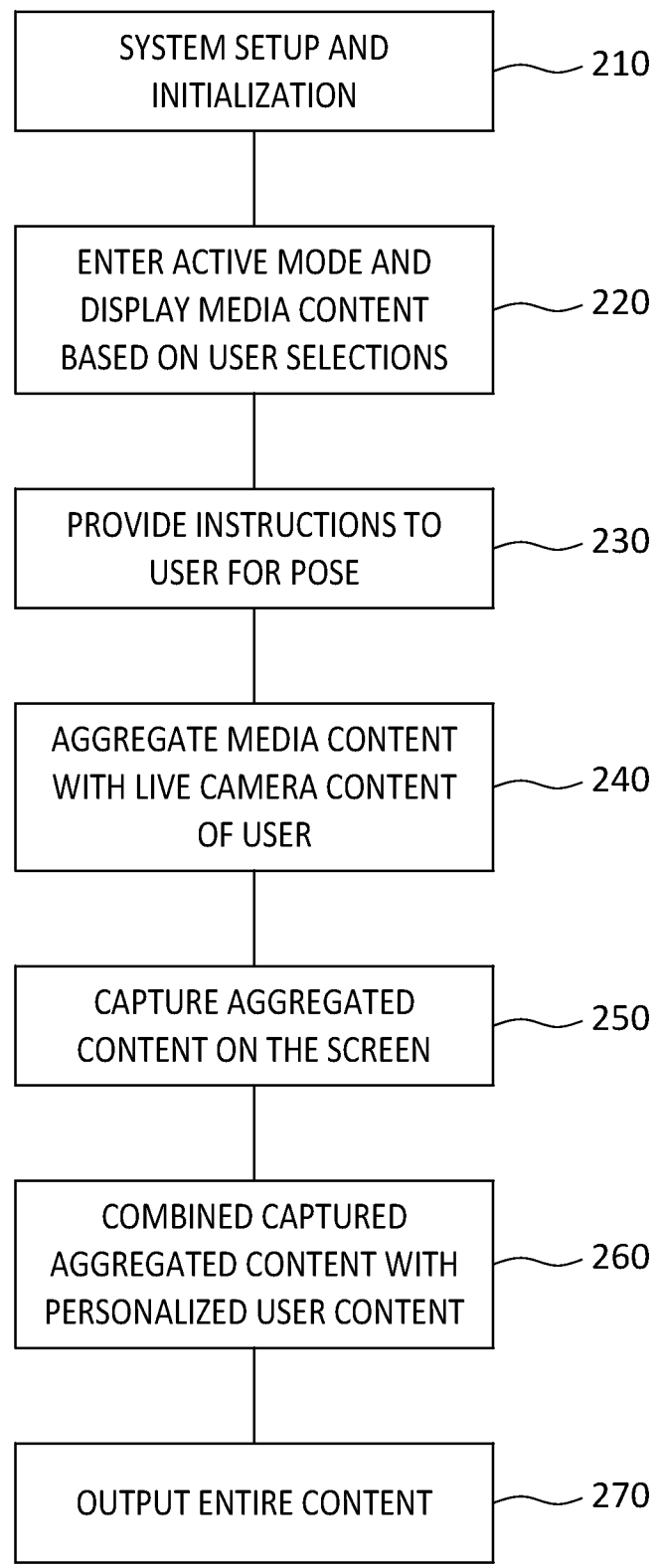
FIG. 2 illustrates an embodiment of a method for providing an augmented reality experience.
Figure 3A:
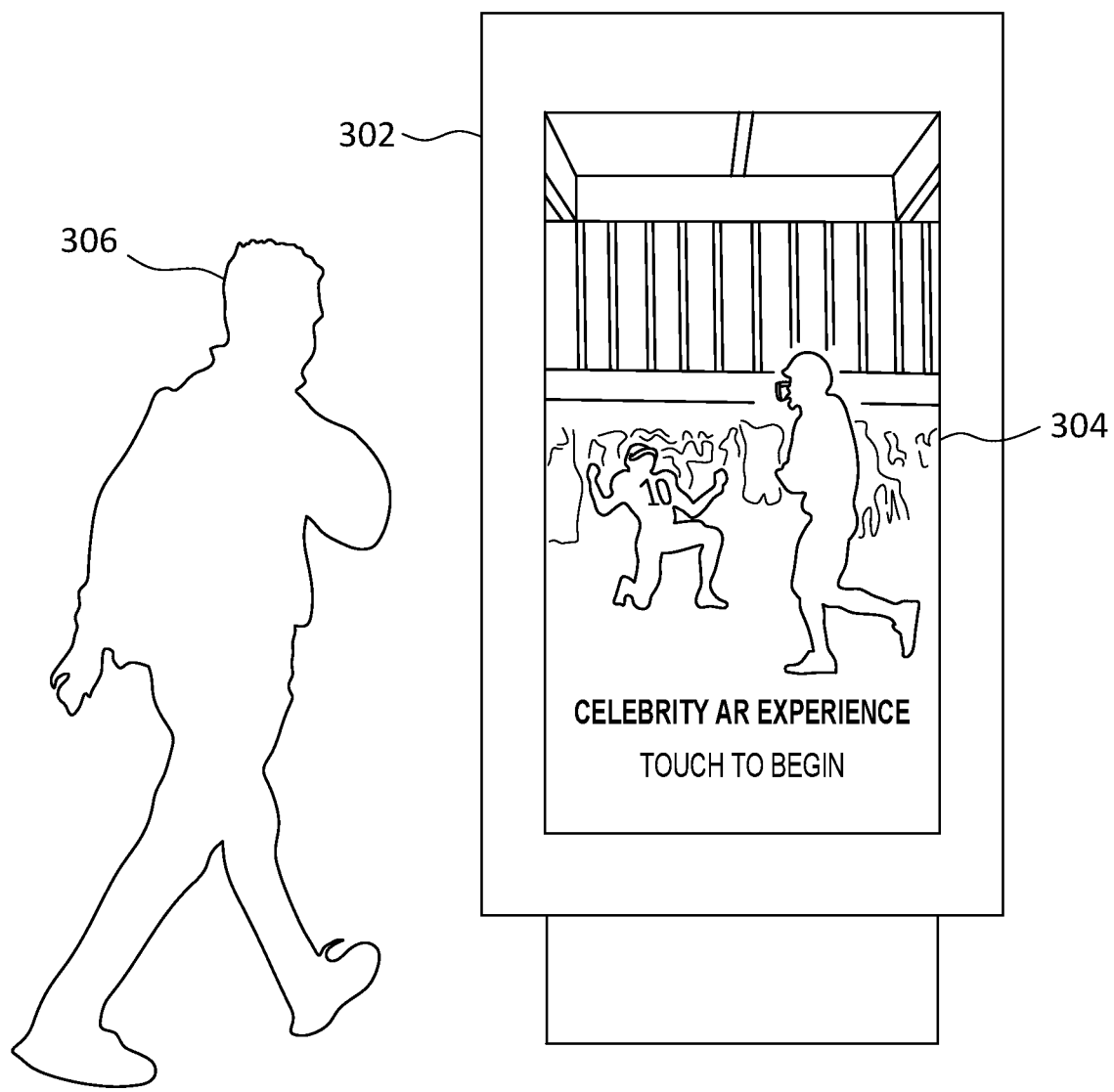
FIGS. 3A to 3O illustrates examples of screen shots that may be generated by the system and method embodiments.
Figure 4:
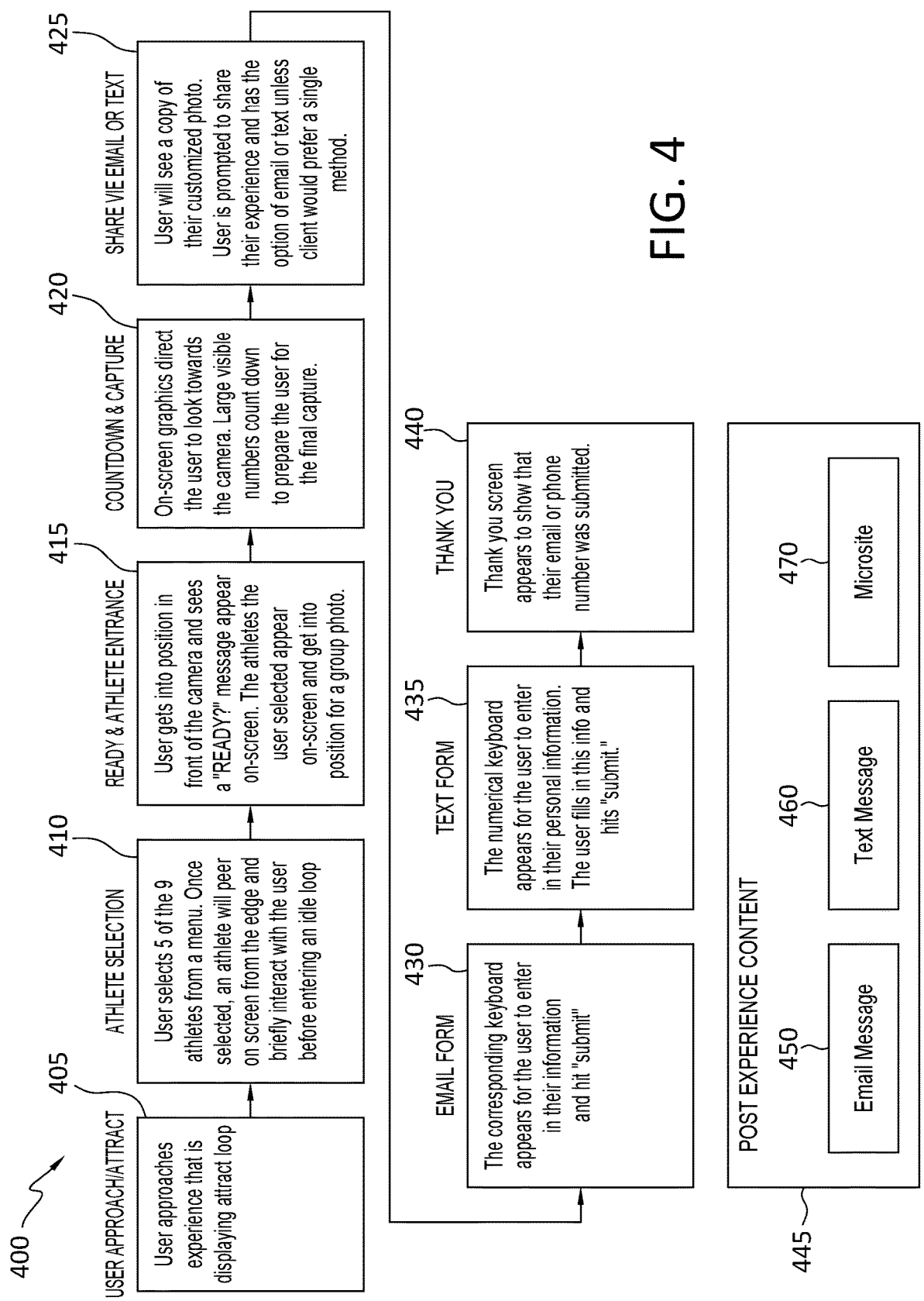
FIG. 4 shows another embodiment of a method for providing an augmented reality entertainment experience.

FIG. 2 illustrates operations included in an embodiment of a method for providing an augmented reality entertainment experience. The method may be performed, in whole or part, by the system of FIG. 1 or another system. FIGS. 3A to 3O are examples of screen shots that correspond to the operations included in the method of FIG. 2. FIG. 4 shows a flow diagram as the process 400 moves from screen to screen. FIG. 4 also illustrates blocks for a post experience content 445.

Referring to FIG. 2, at 210, the system for providing the augmented reality system is set up at a location for user access. The location may be a public area such as a sports stadium or other venue, theme park, restaurant, arcade, shopping mall, movie theater, trade show, convention, or other area of interest which may match the theme of the content of the system. Alternatively, the location may be any one of a number of private venues. In one embodiment, the system may be included in a transportable case or housing, for example, similar to a kiosk or vending machine. In another embodiment, the system may be incorporated into an application implemented on a computer, smartphone, tablet, etc., or accessed at a website of the manufacturer. Once at the location, the system is connected to power and one or more communications networks. The communication networks may include wired and/or wireless networks, including but not limited to a mobile communications network such as a 5G network, the internet, a virtual private network, finance-related networks (e.g., credit card, debit card, ApplePay, Google Pay, and/or other type of networks used during the intended operation of the system.

Once the system is powered and connected to one or more networks, the operating system boots up and enters set-up mode. At this point, it is assumed that the files in the media library have been pre-loaded into the system along with all other information required for proper operation, matching the theme(s) of the entertainment experience intended. In other embodiments, the media files may be accessed during operation over the network connection. After a series of checks are performed by internal diagnostic software, the system is placed in ready mode for interacting with and providing services to users. This may involve displaying a preselected image and/or video file with promotional text encouraging users to receive the offered entertainment experience. For example, when the entertainment theme includes the Dallas Cowboys, the processor of the system may play a video file on the screen of action footage from a recent game. The processor may overlay or otherwise combine text and graphics instructing users to use the system.

FIG. 3A illustrates an example of an initial screen for the Dallas Cowboys application that may be shown on the display monitor 302 of the system. In this example, the processor of the system retrieves content 304 from the media library about the team. For example, the processor may retrieve content including a still image showing a Cowboys player with the text: "Take A Photo With Us!" followed by "Touch To Begin." In another embodiment, the processor may retrieve and play an attract loop video file from the media library with the same text overlaid or may play video from a live feed from the field or other media source with text. In one implementation, a combination of media types (including those mentioned above) may be played on the display screen. As the initial attract screen is displayed, a user walking by may approach and touch the screen to obtain or information and/or to use the system to receive the augmented reality entertainment experience being offered.

Figure 3B:
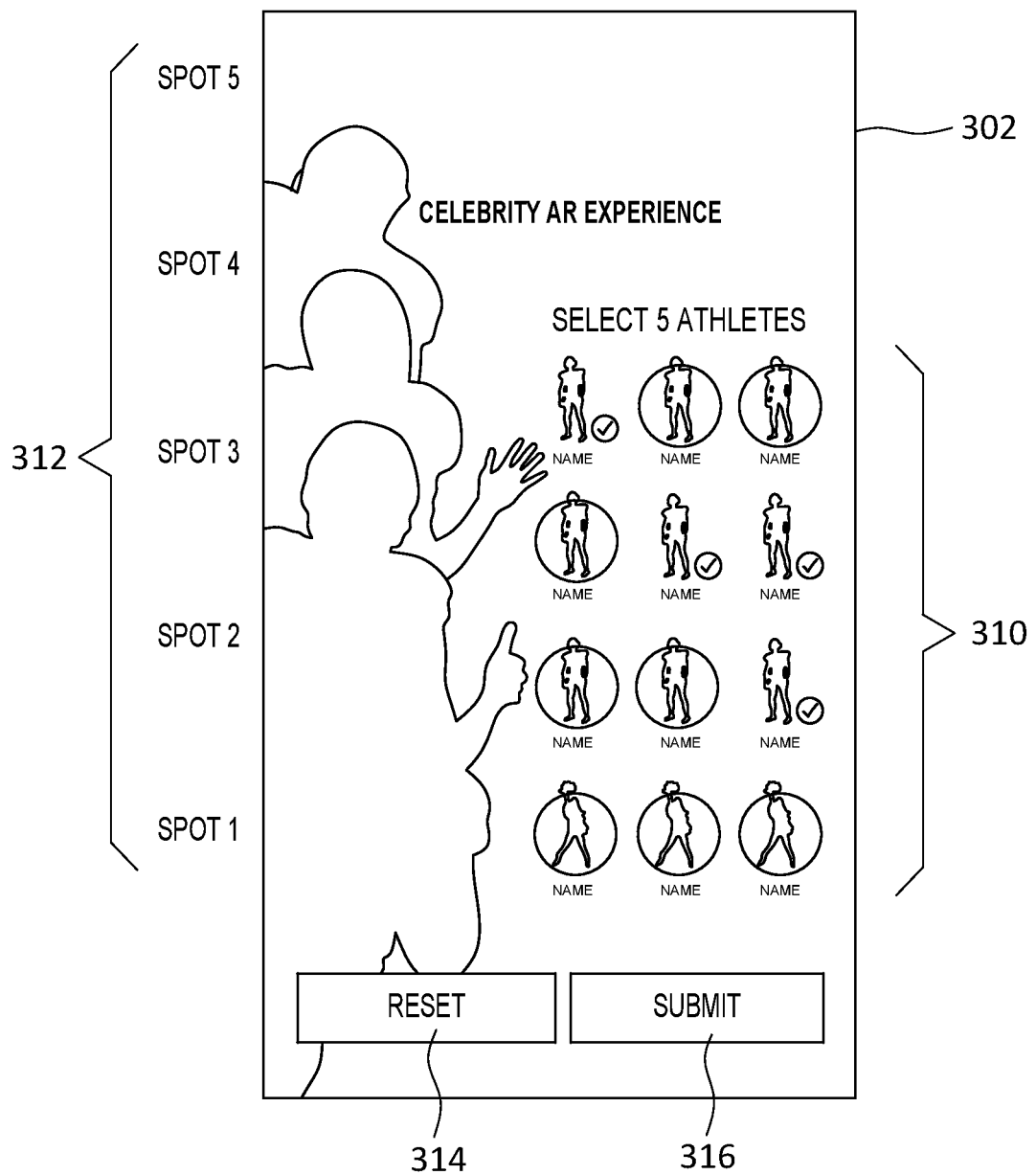

At 220, once the user 306 touches (or otherwise activates) the screen, the processor enters active mode and retrieves additional content and/or information stored in the system 405. For example as shown in FIG. 3B, the processor may display a screen section 310 with images of a predetermined number of Cowboy players and/or Cowboys cheerleaders. In one embodiment, the image of a special guest may be displayed for possible selection by the user. The processor may display another screen section 312 containing, for example, a predetermined number of player silhouettes (e.g., 5) along with text instructing the user to select up to the same number of players, cheerleaders, and/or the special guest. Selections may be made, for example, by the user touching areas of the screen corresponding to the player, cheerleader, etc., images. One or more control areas 314 and 316 may be also displayed, for example, to allow the user to reset the selections and to submit the selections.

Figure 3C:
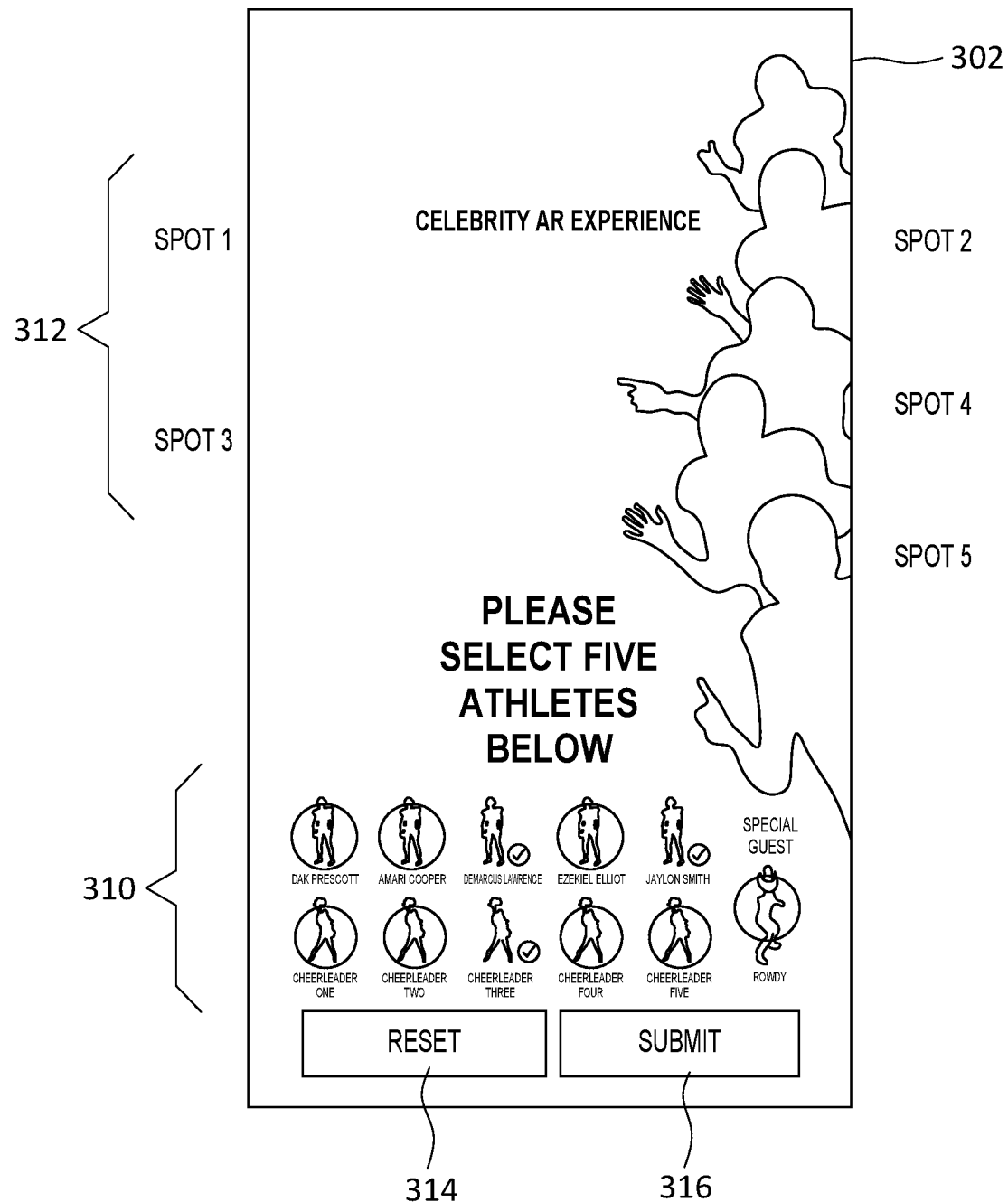

Once a player, etc., is selected 410, the processor may retrieve a video file from the media library of the player waving or performing some other action acknowledging the selection by the user. Examples include waving, pointing, nodding, running into place on the silhouette, and/or other actions. Graphics and/or animations may or may not accompany the video file on the screen. At this point, the selected player may then go into an idle loop bearing his image or video. These actions may enhance the interactive nature of the entertainment experience relative to the user. FIG. 3C shows another example of a screen that may be used at this stage in the process. Here the players are shown along the side of the screen in different spots. The players may enter the spots in the order selected. Also, players may be deselected at this point and another player selected in their place.

Figure 3D:
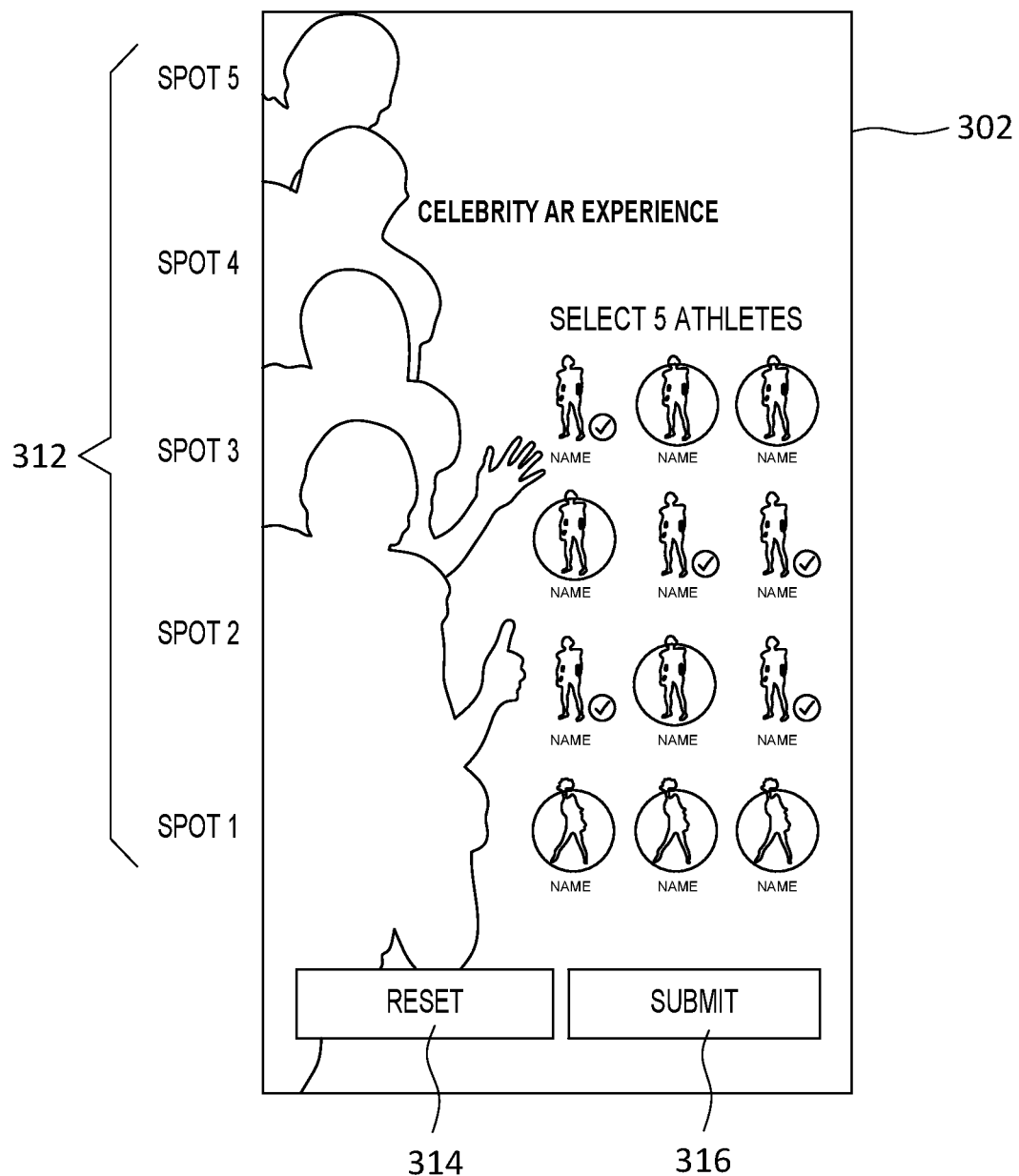
Figure 3E:
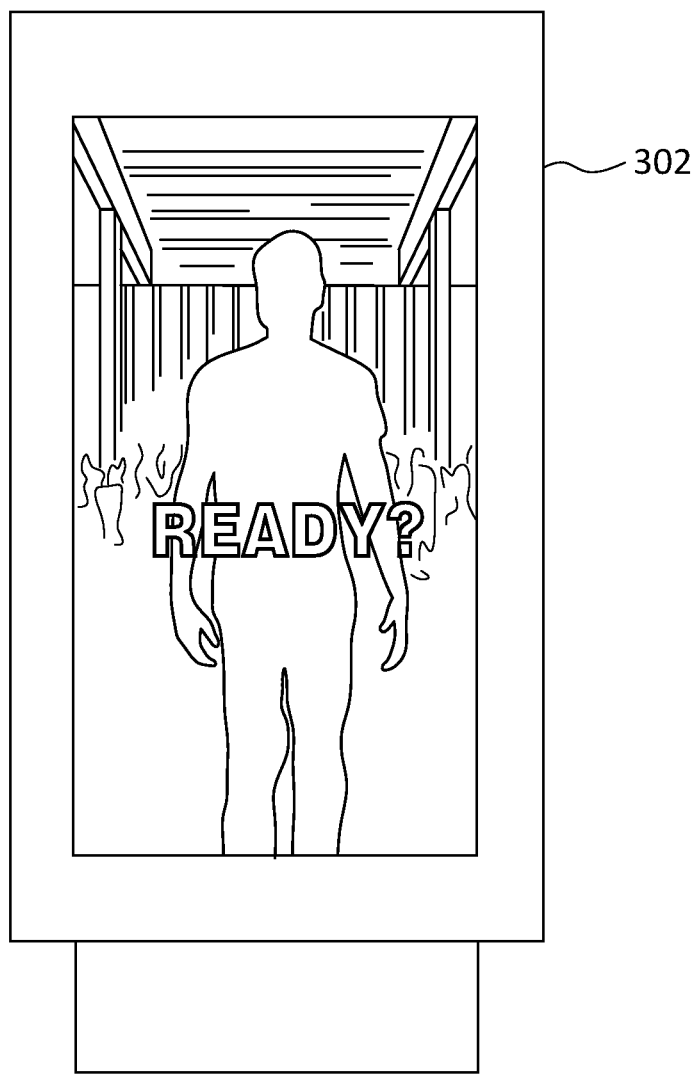

At 230, once all the players of interest have been selected by the user and the submit control is activated as shown in FIG. 3D, the processor retrieves and displays a screen including additional content. In one embodiment, the additional content may include an instruction screen, as shown in FIG. 3E, asking or instructing the user 306 to get ready to take a picture (or video) with the players that were selected. At this point, the processor may generate additional instructions indicating where the user 306 is to stand relative to the system camera (which, in this case, is integrated into the display screen), so that an image of the user 306 will be in proper proportion and position relative to the images or video of the players that were selected 415. The position may be indicated, for example, by a floor marker (e.g., 6 or 7 feet away from the display screen) or an electronic indication may be indicated on the screen when the user 306 has stepped away from the screen by an acceptable distance.

Figure 3F:
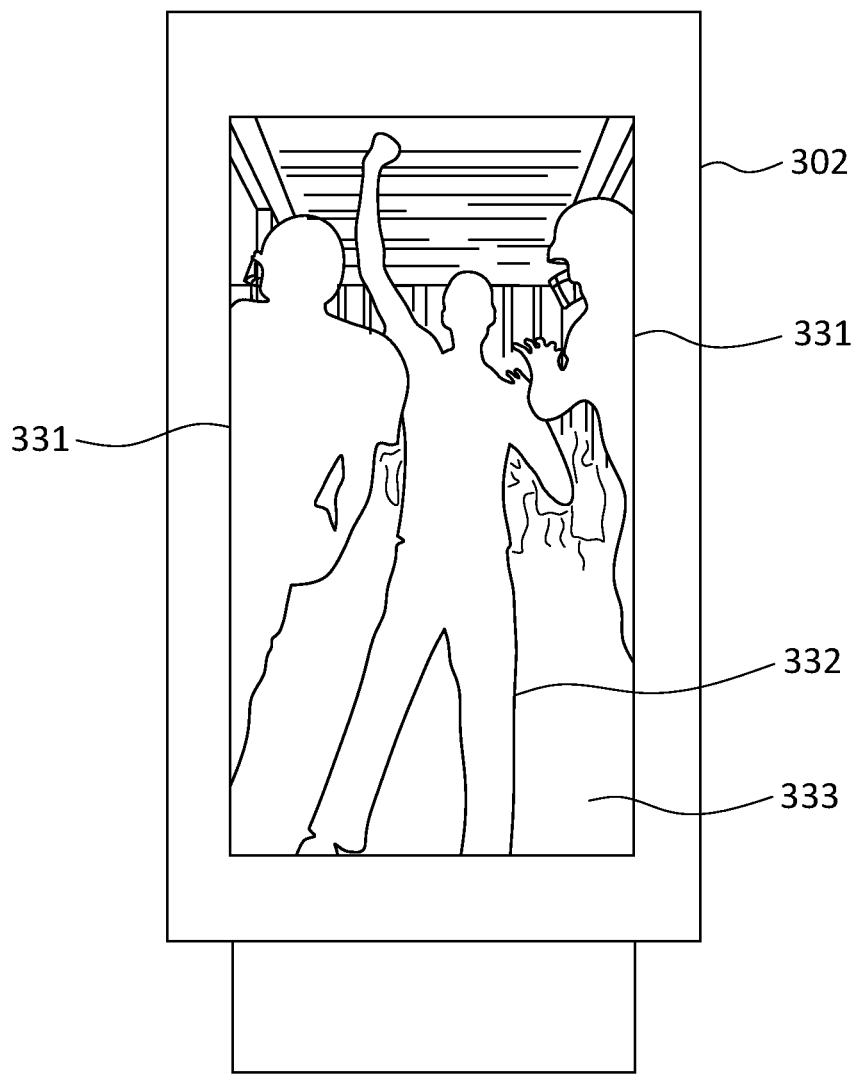

At 240, once the user 306 has indicated (e.g., through a touch input) that he is in position and ready for the picture to be taken, the processor activates the system camera and controls live video from the camera to be displayed on the screen. The processor also retrieves image or video files of the selected players from the media library and displays them on the screen at predetermined positions relative to an area where the live video or image from the camera containing the image of the user 306 is displayed 415. In some embodiments the players may be shown as walking into a specific position 415 around the user 306. In this way, the processor aggregates the selected player content 331 and live camera content 332 simultaneously on the same screen in preparation of capturing a picture or video of the user 306 with the selected players, so that a group image or video may be taken. An example of a screen including this aggregated content is illustrated in FIG. 3F. Aggregation of the content may be processed in a way that increases the visibility and clarity of the final image and in a way that makes the aggregated content looks as realistic as possible, e.g., in a way that looks like the user 306 and the players are actually together at the same location.

In one embodiment, to further increase authenticity or the entertainment product produced, additional content may be displayed in the background. The background content may match the theme and may be one or more of the types of media files stored in the library. For example, in one embodiment, the background content may be an image of the field, locker room, or other location associated with the Dallas Cowboys team. Additionally, or alternatively, the background content may be an image or video of the surroundings where the user is standing (in which case the background content is taken by the camera) or live video of the field or game including live action. The selected player content and live image of the user may be superimposed on the background content. All of the aggregated content may be processed to look more fluid, continuous, or authentic using image processing tools.

Figure 3G:

At 250, once the player content 331, user content 332, and background content 333 are in position and within the field of view of the camera, on-screen graphics may direct the user to look towards the camera 420. In order to guide the user, the processor may generate display of a countdown (e.g., 5 . . . 4 . . . 3 . . . 2 . . . 1) in large visible numbers to prepare the user for the final capture 420. An example of these features is illustrated in FIG. 3G. When the countdown expires, the screen is recorded an aggregated content is generated including the player content, user content, and background content. The aggregated content may then be recorded in the storage area and further processed for further personalization. In an alternative embodiment a system assistant may assist the user in staging themselves in front of the system and/or background (if present).

At 260, the recorded aggregated content may be further personalized based on additional content to be combined with the aggregated content. The additional content to be aggregated includes predetermined content generated based on personal information entered by or otherwise corresponding to the user and/or further selections or designations by the user. The additional content may be superimposed, overlaid, integrated or otherwise combined with the player content (e.g., dynamic video, images, etc.), user content, and background content. The personalization content may include, for example, one or more of the following: graphics including autographs of the selected players, a personalized message to the user (including the name of the user) from one or more of the selected players and/or signed by one or more of the players, and a personalized message to another person designated by a user (e.g., the name of a sick person who loves the Dallas Cowboys). In one embodiment, the user may be given the option of selecting which type of personalized content is to be included. The selection may be made, for example, by performing a touch input on a corresponding display menu of possible personalized content options.

The processor may generate the personalized content, for example, by modifying pre-stored graphics or other content with the name or other personal information of the user. The modification may include overlaying or otherwise combining the personalized content at a predetermined location. For example, the personalized content may be superimposed over a location that does not block more important areas (e.g., faces) of persons shown in the aggregated content. An example of the personalized content 350 aggregated into the recorded screen information 355 is illustrated in FIG. 3H1 as a personalized and signed message: "*Hi John,*, thanks for being our *No. 1 Fan* ! . . . *Dak Prescott*." While the present embodiment involves aggregating player content, it is to be understood that other content (cheerleader content, guest content, etc.) may be aggregated, alternatively or additionally, with the other content including the personalized content. For example, aggregated content in the form of personalized content 357 (cheerleader autograph) superimposed over an image of the cheerleader 358, who was selected in a previous screen as described above as shown in FIG. 3H2. In addition to personalization of the aggregated content, branding information may be added to the final image, where the branding information be for the team, performer, sponsor of the system, etc.

Once the screen capture has been performed, the method may optionally include retrieving and displaying a video file from the media library showing the selected players leaving and walking off the screen. In addition, in one embodiment, a screen may for accepting payment may be displayed and the payment validated before the active mode is entered. In another embodiment, payment may be entered and validated at the end of the process.

Figure 3I:
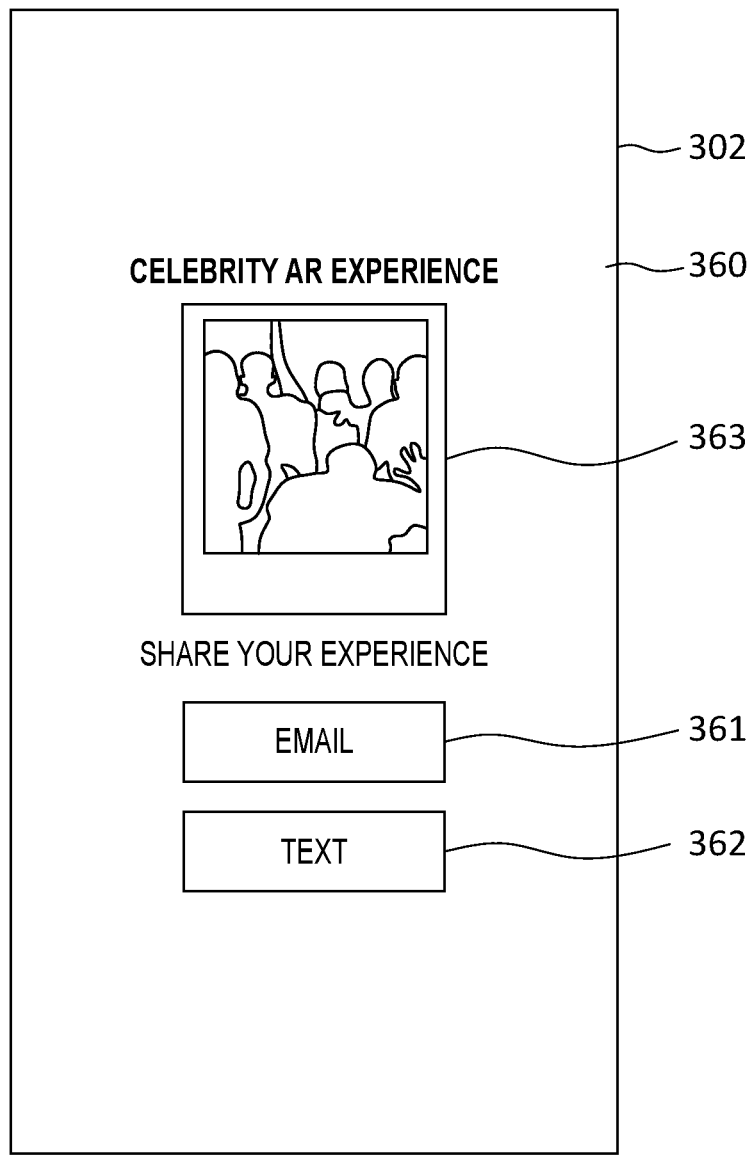
Figure 3J:
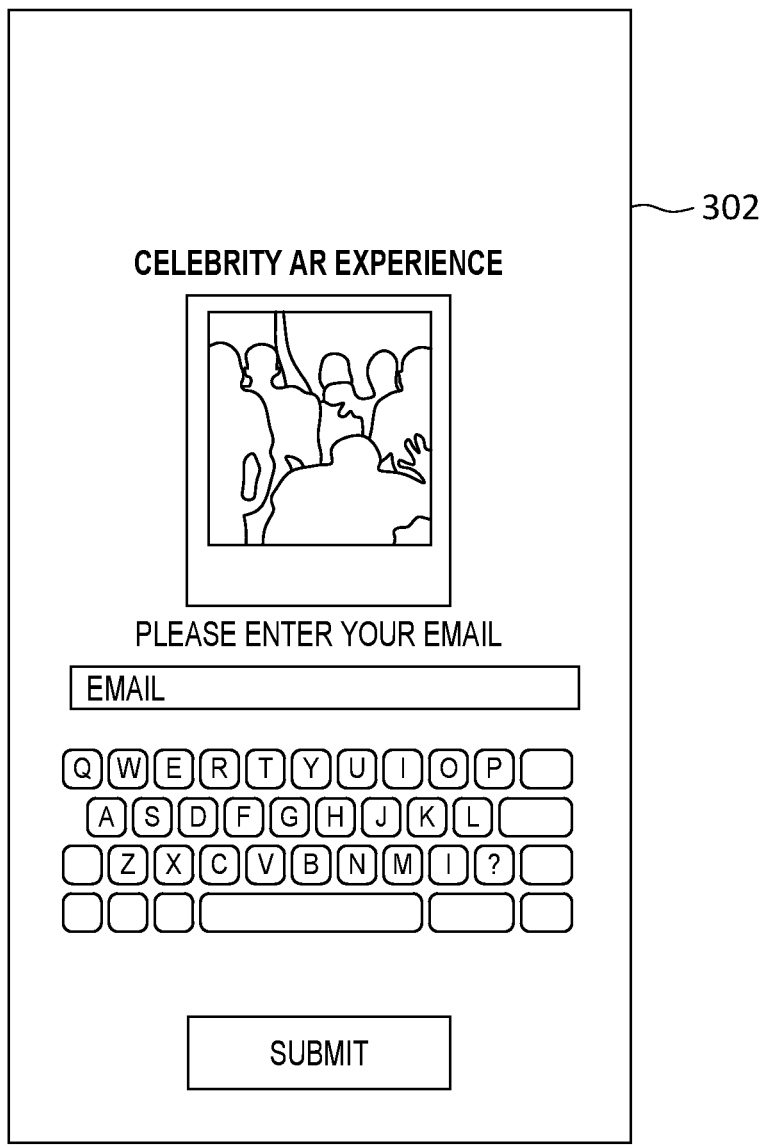
Figure 3K:
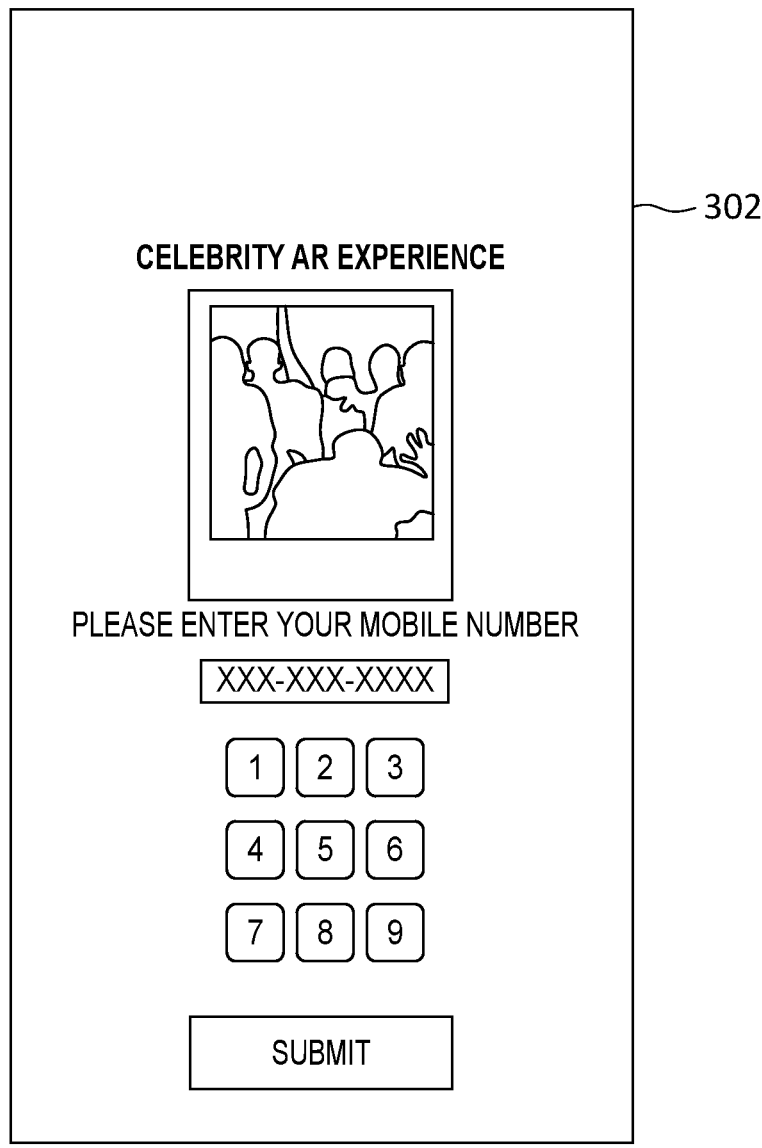
Figure 3L:
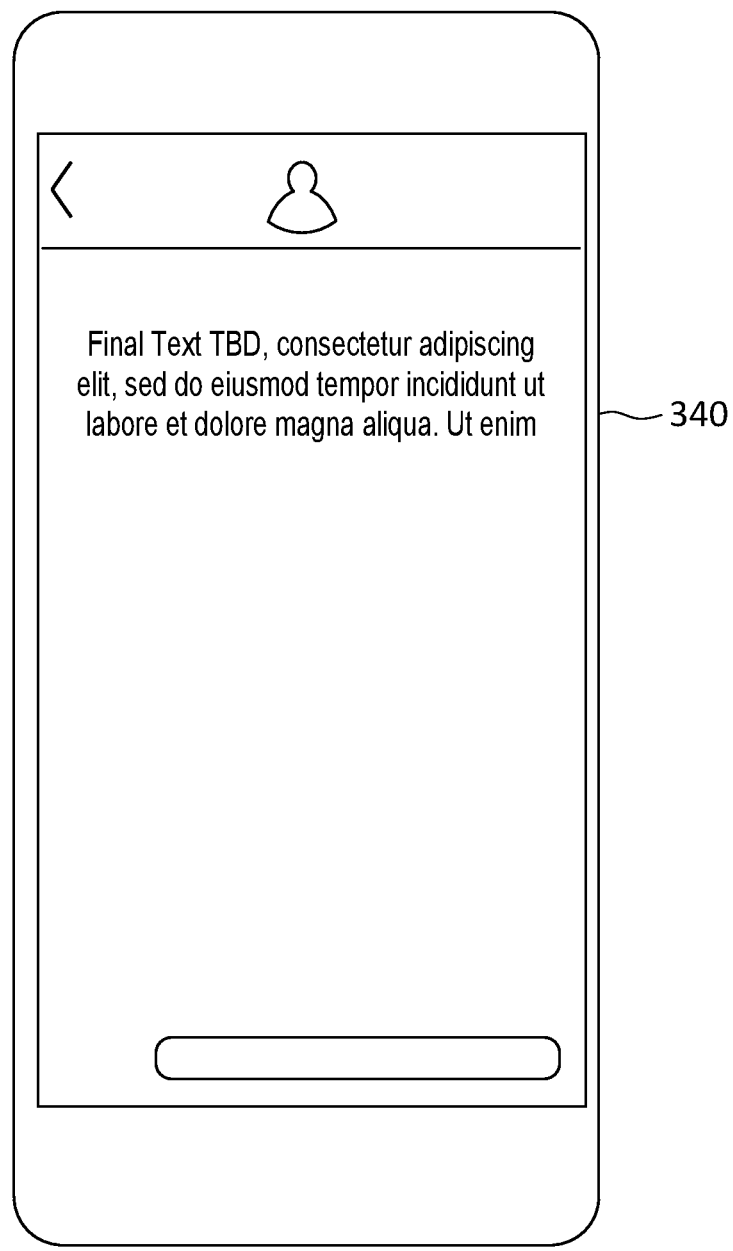
Figure 3M:
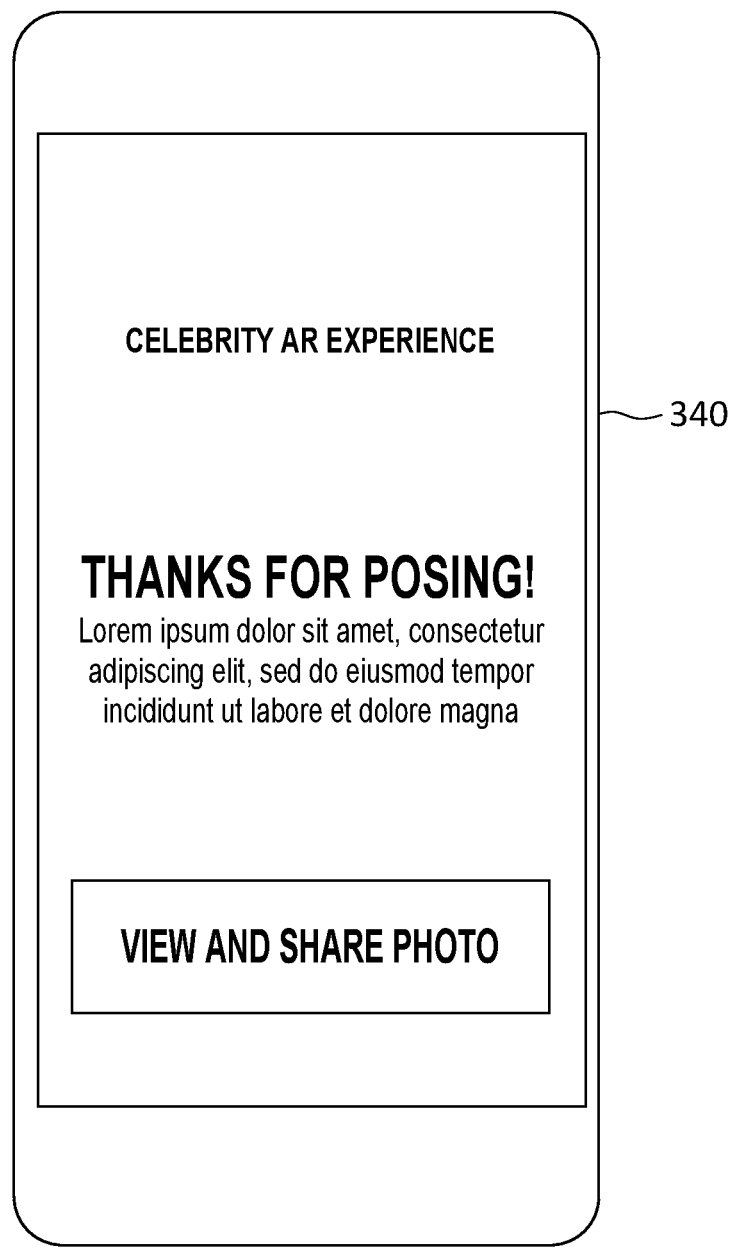
Figure 3N:
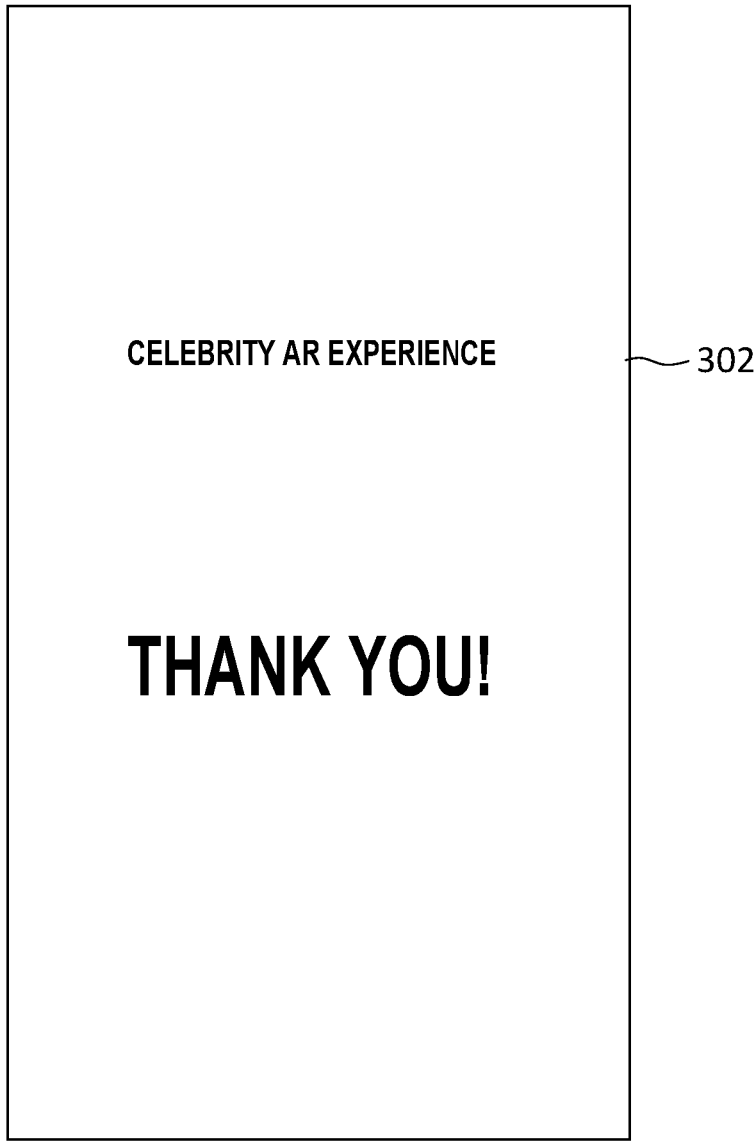
Figure 30:
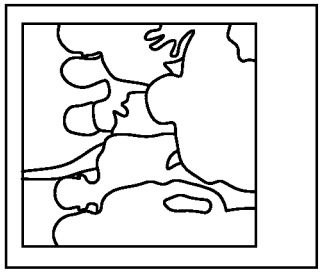

At 270, the processor generates a screen giving the user the option of how to output the entire content processed by the system 425. As illustrated in FIG. 3I, the screen 360 may include an option 361 to email the content and/or an option 362 to text the content 425. This screen may also include a section 363 that includes the final aggregated content, which, for example, may be cropped or processed in various ways with the personalized content included. One or more additional screens illustrated in FIGS. 3J and 3K may be generated 430 and 435 to allow the user to enter his email address and/or phone number for text messaging the content. In one embodiment, the system may send a text 460 or email 450 to the user's device 340 with a link for example to a microsite 470, as illustrated in FIG. 3L, for accessing the content stored at a server connected to the system. Other screens may thank the user for using the system 440, as illustrated in FIGS. 3M and 3N, and another screen may give the user the option to share or upload the content to a social media site, to download the photo, and/or to print out the content from a printer included within the system, as illustrated in FIG. 3O.

In additional embodiments, when a user first interacts with the system, the user may scan a credential or enter a code so their content is tied to their microsite. The credential or code may be generated in various ways including using a mobile application or signing up at a user terminal.

Figure 5:
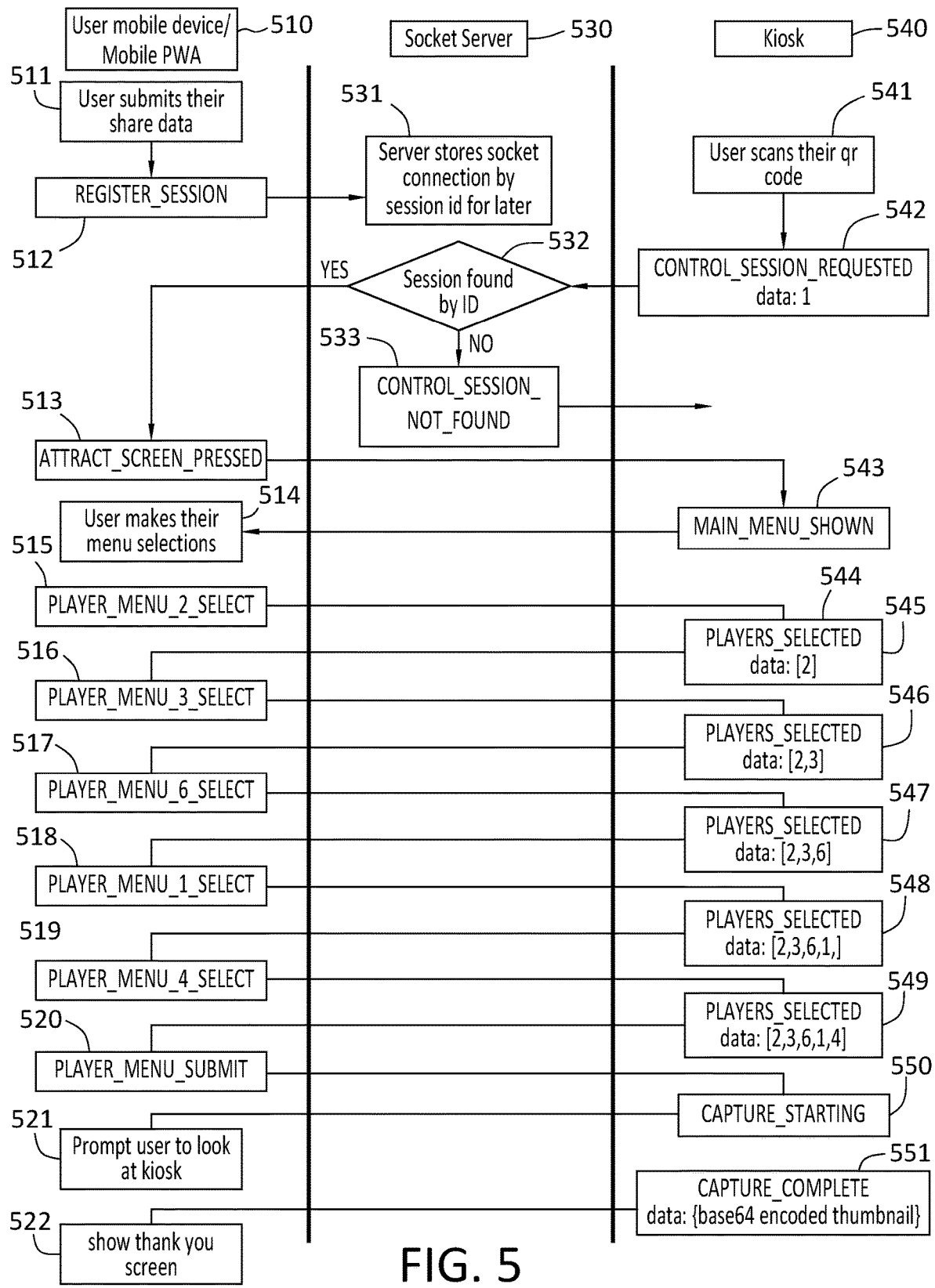
FIG. 5 illustrates the data flow between the different elements of the system.

In another embodiment of the system a contactless interface may be used where a user uses their mobile device to interact with the system. FIG. 4 illustrates a flow diagram of the operation of the system. FIG. 5 illustrates the data flow between the different elements of the system. FIGS. 6A to 6D illustrate screen shots on the system display. FIGS. 7A to 7G illustrate screen shots from a user's mobile device. The operation of the system will not be described using the various figures.

The kiosk system 540 may be similar to the system of FIG. 1. It includes a display, a camera, and various computing components as described above. A socket server 530 maybe implemented on the web or hosted on another server that facilitates interaction between a user device 510 and the kiosk 540. A user device 510 may download a progressive web application (PWA) that allows the user to interact with the kiosk 540. Other methods may be used to allow the user to use a user device to interact with the system such as a dedicated application, other web interfaces and applications, etc.

Figure 6A:
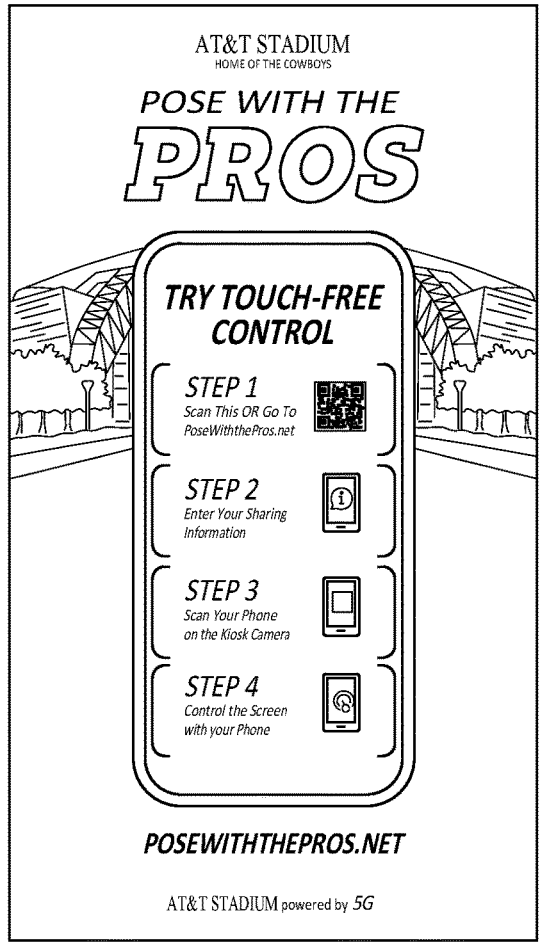
FIGS. 6A to 6D illustrate screen shots on the system display.

The user approaches the kiosk 540 hosting the experience that displays a attract loop 405. The user will see URL, QR code, or other instructions on the kiosk display, on signs nearby, or in other locations nearby to input into their user device in order to download the WPA to their device. At this point the user may be encouraged to join the local WiFi network in order to provide a more stable communication channel with the socket server 530. FIG. 6A illustrates a screen that may be displayed by the display that provides instructions to try touch free control of the experience. In this example a QR code is displayed that the user may capture that will load the WPA onto the users device 510.

Figure 7A:
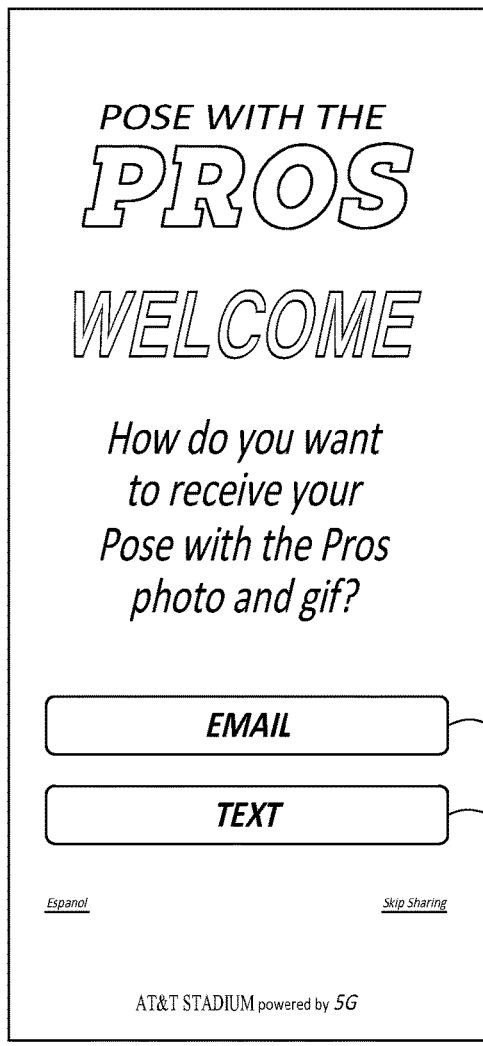
FIGS. 7A to 7G illustrate screen shots from a user's mobile device.
Figure 7B:
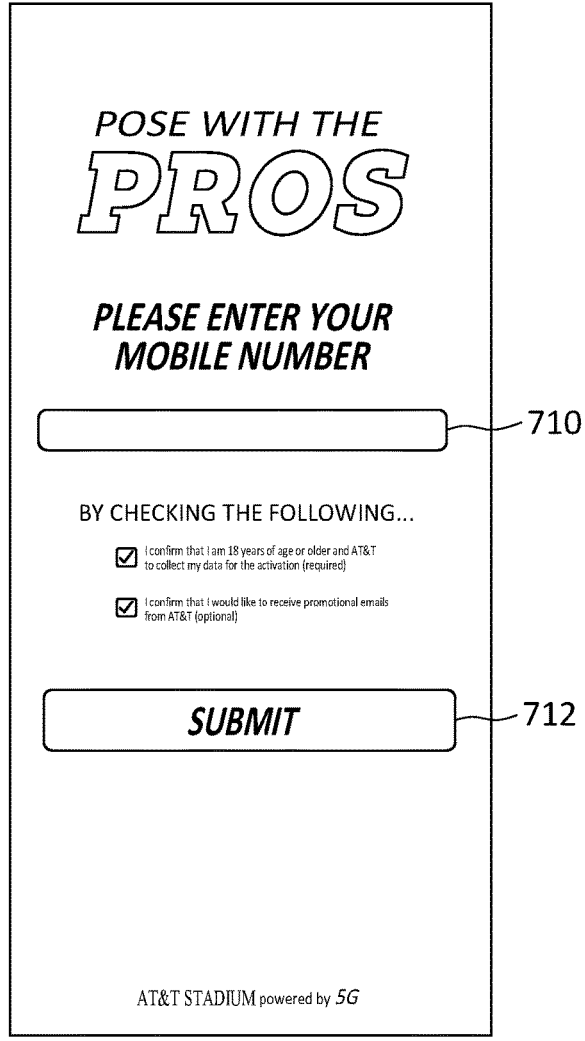
Figure 7C:
Figure 7D:
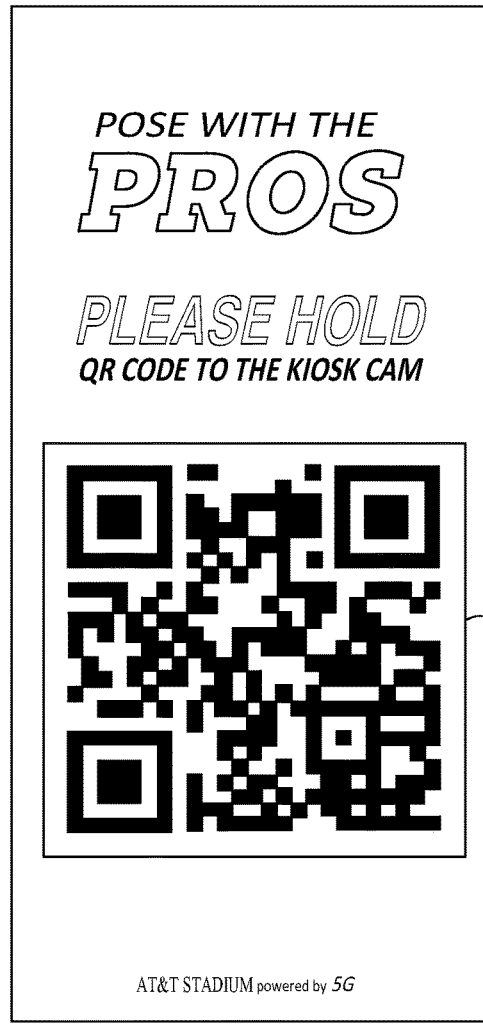

Typically the user will be in line waiting to use the kiosk and at that time will start the process by entering the URL code or scanning the QR code. Using the WPA on their device, the user will submit their share data 511. The WPA may present instructions and screens to allow the user to enter information. This may be done while waiting to access the kiosk if there is a line. The WPA may present a screen as illustrated in FIG. 7A that asks how the user would like to receive their photo and GIF. The user may select either via email or via text. If the user selects via text, then a screen such as illustrated in FIG. 7B will be presented to the user so that the user may enter their mobile phone number. If the user selects via email, then a screen such as illustrated in FIG. 7C will be presented to the user so that the user may enter their email address. This information may be used to register a session for the user 512, and a session ID may be created and the information sent to the socket server 530. The socket server 531 stores the information received from the user for later use. The PWA may then generate a QR code on the users device display as illustrated in FIG. 7D. The QR code may include user information and the session ID.

Once it is the user's turn, the user will present their QR code to the kiosk that will scan the QR code using its camera 541. The kiosk decodes the data from the QR code and requests a session 542 from the socket server 530. The socket server determines if a session for the QR code is found 532. If not, then the socket server 530 indicates that not session was found 533. Otherwise, the socket server 530 communicates to the PWA that the QR code was accepted and the WPA begins interacting with the kiosk 540 via the socket server 530. Also at this time the socket server 530 may determine if the user has a stable connection with the socket server. If so, the process will proceed as follows. If not, an alternative approach will be described below.

Figure 7E:
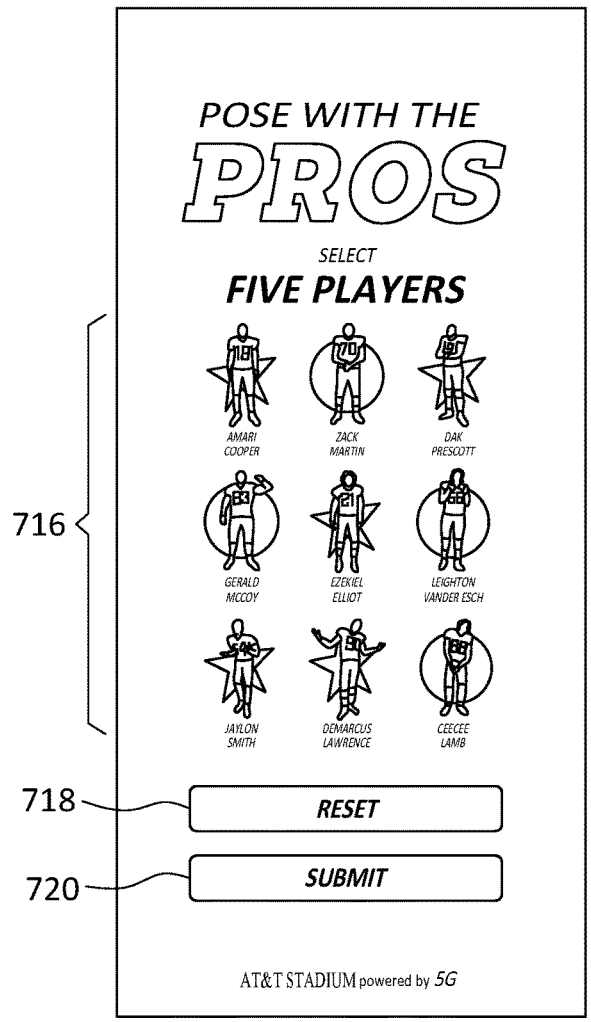

At this point the kiosk 540 will display a main menu 543 that illustrates players to be selected. Also the PWA at this point presents a menu such as that shown in FIG. 7E that allows the user to make menu selections 514. Next, the user selects athletes from the menu 410. For example, the user may select 5 from a total of 9 or any number athletes 716 on the menu 515-519. Each of the player selections are transmitted to the kiosk where data for the selected players are noted and updated 545-549. As described above, the player may peer on the user's screen from the edge and briefly interact with the user before entering an idle loop. As similar screen may also appear on the kiosk display. During the section, the selected players may include an indication when selected, such a background star as shown in FIG. 7E. Players that have not been selected may have a different indication such as a circle as shown in FIG. 7E. Also, the user may select and deselect players and as this is done the players will leave or enter the screen accordingly. Also, the user may reset their selections as any time using the reset button 718. Once the user is satisfied with their player selections, the user presses the submit button 720, and the PWA sends a submit indication 520 to the kiosk 540.

Figure 6B:
Figure 6C:
Figure 7F:
Figure 7G:
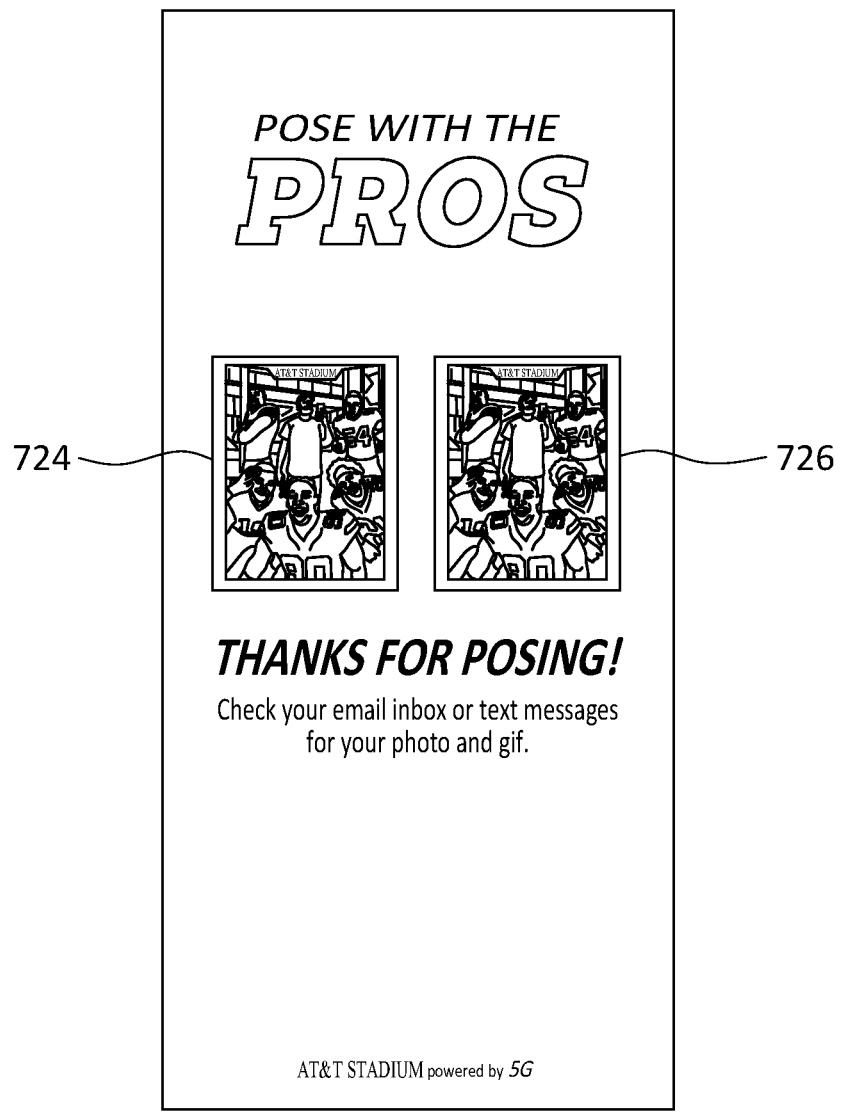

The kiosk 540 will now present a screen 415 to the user indicating for them to get ready for the picture as described above 550 and to get in position. In some embodiments a spot may be marked where the user should stand. Also the kiosk may recognize that the user is not in the correct position, and provide simple commands for the user to more forward/backwards or to the left or the right. Next, the selected athletes enter onto the display around the user as previously described above. Then, the on-screen graphics direct the user to look towards the camera 420, 521. As previously described, large numbers may be displayed counting down to prepare the user for image capture. In some embodiments, the kiosk may capture a second image that is a short video clip to be output as a GIF. In this situation the kiosk displays a message indicating that the GIF capture is next as illustrated in FIG. 6B. Then a screen such as illustrated in FIG. 6C may be displayed by the kiosk encouraging the user to move during the GIF capture. The user moves and the GIF is captured. Once the kiosk completes the capture 551, the kiosk display may show a thank you screen. Also, the kiosk 540 may indicate the capture is complete to the PWA, and the user device 510 may display a thank you screen as illustrated in FIG. 7G.

After the user completes the experience with the kiosk, the user may access their photos later 445. The user will receive either a text message or an email message pointing to a microsite 470 where they may access and download their photos.

The personalization steps described with respect to FIGS. 3H1 and 3H2 may also be added to this process so as to produce a personalized image for the user.

Figure 6D:
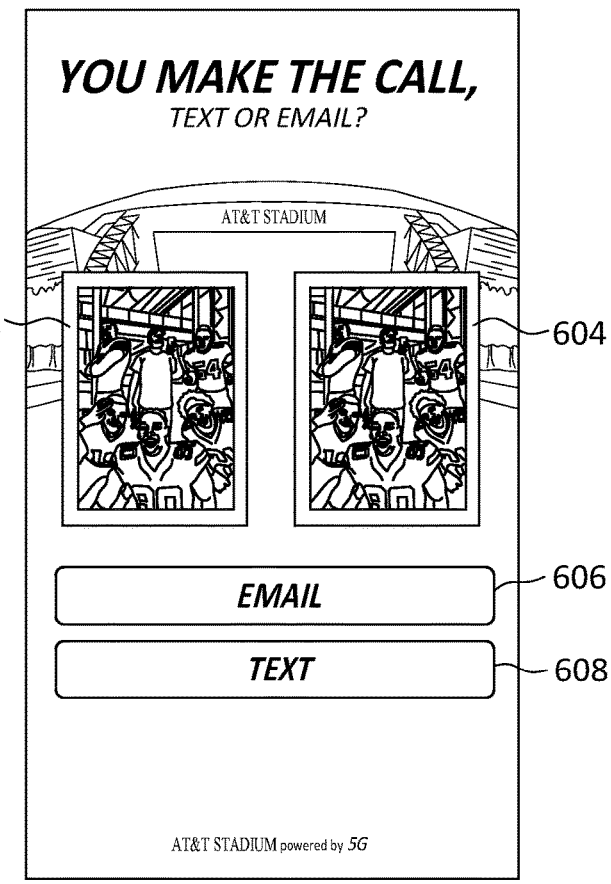

In the embodiment described above the user entered their choice of receiving a text message or email message with the link to their photos prior to selecting players and taking an image. Alternatively, this selection may happen after the image is captured. For example, after the image capture, the user's device may display a screen as shown in FIG. 6D at this point as well as the kiosk display displaying a screen such as illustrated in FIG. 7A. The user may then choose to receive a message via email or text. Then as before an email form 430 as shown in FIG. 7C may be shown for the user to enter their email address, or a text form 435 as shown in FIG. 7B may be shown for the user to enter their mobile number.

When the user connection is not stable, another approach for player selection may be used. In this situation the user will select players on their user device 510 using the PWA. Because of bandwidth limitations, the player animations previously describe may not be used and instead still images may be used instead. Once the user has selected their players, then a QR code will be generated and displayed on the users device as illustrated in FIG. 7F. This QR code will include information regarding the players that the user selected. The QR code may also include user information and the session ID. The user may present this QR code to the camera in the kiosk, and the kiosk can then determine the players the user selected. This information may also be shared with the socket server 530. This embodiment has the advantage of being able to complete the experience when only low data rate or unstable wireless communications are possible.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

The methods, processes, and operations of the system embodiments described herein may be performed by code or instructions to be executed by a computer, processor, controller, or other signal processing device. The code or instructions may be stored in the non-transitory computer-readable medium as previously described in accordance with one or more embodiments. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The data processing and control features of the embodiments disclosed herein may be implemented in logic which, for example, may include hardware, software, or both. When implemented at least partially in hardware, the data processing and control features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the data processing and control features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system for providing an augmented reality experience, comprising:
   a processor with a network connection;
   a display; and
   a camera,
   wherein the processor is configured to:
      read a first QR code from a user device using the camera;
      send a session identifier extracted from the QR code to a server;
      receive user input from a user device selecting individuals;
      select media content from a media library based on the received user input;
      combine live content of the user from the camera with the media content;
      display the combined content on the display;
      capture an image of the combined medial content and live content on the display; and
      output the captured image.

2. The system of claim 1, wherein the processor is further configured to add personalized content to the captured image including the media content and the live content.

3. The system of claim 1, wherein receiving user input from a user device selecting individuals includes reading a second QR code from the user device using the camera.

4. The system of claim 1, wherein receiving user input from a user device selecting individuals is received from the server and wherein the user input is input on a user device and communicated to the server by the user device.

5. The system of claim 1, wherein the processor is further configured to display instructions to the user to position themselves.

6. The system of claim 1, wherein the processor is further configured to capture a video clip of the combined media content and live content on the display and to output the captured video clip.

7. The system of claim 1, wherein the processor is further configured to
   receive a user input regarding a message delivery method, and
   send a message to the user using the received message delivery method providing the location to view and download the captured image.

8. A method performed by a user device for providing an augmented reality experience with a kiosk, comprising:
   receiving input information associated with the augmented reality experience at the kiosk;
   presenting a display to a user on the user device requesting user information;
   receiving user information;
   transmitting the user information to a server;
   generating a first QR code based upon the user information;
   displaying the first QR code on the user device;
   presenting a user interface displaying a plurality of individuals;
   receiving user input selecting a set of the plurality of individuals; and
   transmitting the set of selected individuals to the kiosk.

9. The method of claim 8, wherein receiving input information associated with the augmented reality experience at the kiosk includes receiving a URL input by the user.

10. The method of claim 8, wherein receiving input information associated with the augmented reality experience at the kiosk includes scanning a second QR code.

11. The method of claim 8, wherein the user information includes one of a user name, a user email address, and a user phone number.

12. The method of claim 8, wherein the first QR code includes an identifier for the user that was sent to the server.

13. The method of claim 8, wherein transmitting the set of selected individuals to the kiosk includes transmitting the set of selecting individuals to the server.

14. The method of claim 8, wherein transmitting the set of selected individuals to the kiosk includes generating a second QR code indicating the set of selected individuals and displaying the second QR code on the user device.

15. The method of claim 8, further comprising receiving a messaging method input from the user indicating the users selected messaging method and transmitting the messaging method input to the server.

16. The method of claim 15, further comprising receiving a message with a link to an image generated by the kiosk.

17. The method of claim 16, further comprising receiving a user input selecting the link and displaying the image generated by the kiosk.

18. The method of claim 8, wherein the steps of receiving input information associated with the augmented reality experience at the kiosk, presenting a display to a user on the user device requesting user information, receiving user information, and transmitting the user information to a server occur while the user is waiting to access the kiosk.

19. The method of claim 8, further comprising the user selecting one of the plurality of individuals and displaying an animation of selected individual.

20. A system for providing an augmented reality experience, comprising:
   a processor with a network connection;
   a display; and
   a camera,
   wherein the processor is configured to:
      select media content from a media library based on a user selection signal;
      combine live content from the camera with the media content
      displaying the combined content on the display;
      capture an image of the combined medial content and live content on the screen;
      add personalized content to the captured image including the media content and the live content; and
      output the captured image with the added personalized content, wherein the media content corresponds to a predetermined entertainment theme and the live content includes an image of a user posing live at a screen position relative to the media content, the media content including display of one or more persons selected by the user selection signal, and wherein the personalized content includes a personal feature corresponding to the user.

* * * * *